(12) United States Patent
Hata

(10) Patent No.: US 7,295,243 B2
(45) Date of Patent: *Nov. 13, 2007

(54) AUTOFOCUS APPARATUS HAVING A FLASH SYNCHRONIZED TO AN AUTOFOCUS SAMPLING TIME

(75) Inventor: Daisuke Hata, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 743 days.

This patent is subject to a terminal disclaimer.

(21) Appl. No.: 10/665,465

(22) Filed: Sep. 22, 2003

(65) Prior Publication Data

US 2004/0056975 A1 Mar. 25, 2004

Related U.S. Application Data

(63) Continuation of application No. 09/404,546, filed on Sep. 24, 1999, now Pat. No. 6,700,614.

(30) Foreign Application Priority Data

Oct. 8, 1998 (JP) ................... 10-286547

(51) Int. Cl.
*H04N 5/222* (2006.01)

(52) U.S. Cl. ................. 348/371; 348/208.11; 348/346; 348/211.9; 348/349; 348/354; 348/355; 348/356; 348/208.12; 348/345; 348/79

(58) Field of Classification Search .......... 348/208.11, 348/346, 211.9, 349, 354, 355, 356, 208.12, 348/345; 396/79
See application file for complete search history.

(56) References Cited

U.S. PATENT DOCUMENTS

| 4,771,307 | A | * | 9/1988 | Kuno et al. .................... 396/98 |
| 4,881,127 | A | * | 11/1989 | Isoguchi et al. ............ 348/296 |
| 6,108,495 | A | * | 8/2000 | Takahata et al. .............. 396/89 |
| 6,342,922 | B1 | * | 1/2002 | Mizoguchi .................. 348/355 |
| 6,430,368 | B1 |  | 8/2002 | Hata |

FOREIGN PATENT DOCUMENTS

| JP | 61-262382 | 11/1986 |
| JP | 64-59311 | 3/1989 |
| JP | 1-187521 | 7/1989 |
| JP | 5-268505 | 10/1993 |
| JP | 06-090397 | 3/1994 |
| JP | 07-092371 | 4/1995 |
| JP | 9-15490 | 1/1997 |

* cited by examiner

*Primary Examiner*—David Ometz
*Assistant Examiner*—Usman Khan
(74) *Attorney, Agent, or Firm*—Oblon, Spivak, McClelland, Maier & Neustadt, P.C.

(57) ABSTRACT

The autofocus apparatus determines a focus position according to a result of sampling an AF evaluated value and drives a lens system to the focus position. This autofocus apparatus further performs a flash in synchronism with a sampling timing of an AF evaluated value.

12 Claims, 13 Drawing Sheets

FIG.4

| ZOOM STEP | ccdaf drv data | fp far def | fp near def | fp far calc | fp near calc | nml smp |
|---|---|---|---|---|---|---|
| 00 | 03 | 00 | 90 | 08 | 19 | 07 |
| 01 | 03 | 07 | 2d | 10 | 24 | 08 |
| 02 | 03 | 11 | 3b | 1b | 32 | 09 |
| 03 | 03 | 1a | 4b | 24 | 40 | 0a |
| 04 | 03 | 22 | 5b | 2c | 50 | 0b |
| 05 | 03 | 28 | 6c | 35 | 5f | 0c |
| 06 | 04 | 2a | 7c | 38 | 6f | 0d |
| 07 | 04 | 23 | 8b | 31 | 7c | 0e |
| 08 | 04 | 01 | 90 | 11 | 80 | 0f |

FIG.7

| POS (I) | f (mm) | ZP | No0 ∞ | No0 20cm | No1 ∞ | No1 20cm | No2 ∞ | No2 20cm |
|---|---|---|---|---|---|---|---|---|
| W END | 5.1 | 10 | 0 | 0 | 0 | 17 | 0 | 17 |
| .. | 5.51 | 26 | 7 | 17 | 8 | 28 | 9 | 29 |
| .. | 6.089 | 46 | 17 | 27 | 19 | 42 | 20 | 43 |
| .. | 6.742 | 67 | 26 | 40 | 28 | 56 | 31 | 59 |
| M | 7.553 | 89 | 34 | 54 | 38 | 72 | 41 | 75 |
| .. | 8.585 | 112 | 40 | 68 | 45 | 87 | 49 | 92 |
| .. | 9.944 | 138 | 42 | 83 | 48 | 103 | 53 | 108 |
| .. | 11.814 | 168 | 35 | 98 | 41 | 116 | 48 | 123 |
| T END | 14.55 | 206 | 1 | 110 | 9 | 120 | 17 | 128 |
|  |  |  |  | 112 |  |  |  |  |

FIG.10

| ENA | IN1 | IN2 | OUT1 | OUT2 | OUT3 | OUT4 | REFERENCE |
|---|---|---|---|---|---|---|---|
| L | — | — | OFF | OFF | OFF | OFF | STANDBY |
| H | L | L | H | L | H | L | TWO-PHASE EXCITATION |
| H | L | H | H | L | L | H | |
| H | H | H | L | H | L | H | |
| H | H | L | L | H | H | L | |

FIG.11A  VD    VD 1/60Hz (17mS)
FIG.11B  AF EVALUATED VALUE SAMPLING TIMING (FETCH AN IMAGE)
FIG.11C  LENS-DRIVING PULSES
FIG.11D  FLASH TIMING

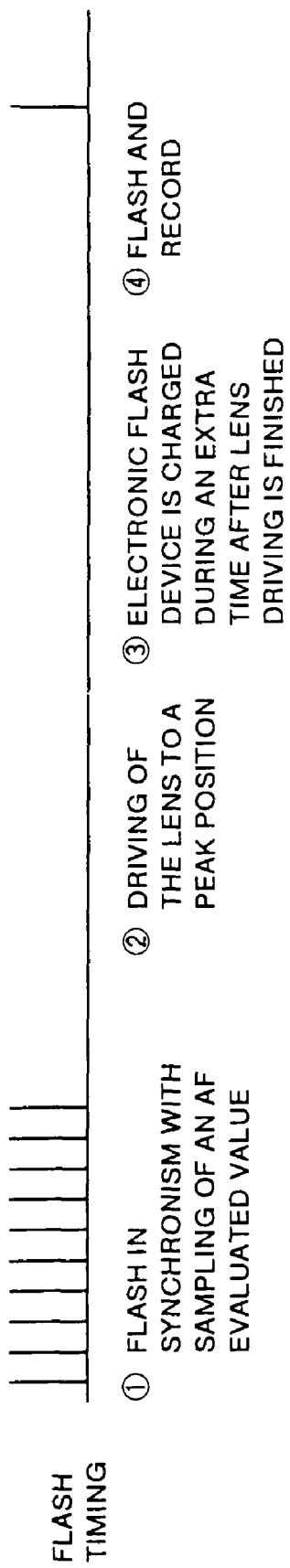

AUTOFOCUS APPARATUS HAVING A FLASH SYNCHRONIZED TO AN AUTOFOCUS SAMPLING TIME

FIELD OF THE INVENTION

The present invention relates to an autofocus apparatus. More particularly, this invention relates to an autofocus apparatus for a digital camera or a digital video camera.

BACKGROUND OF THE INVENTION

Various systems have conventionally been proposed for the autofocus apparatus. For example, in silver-salt cameras of single-lens reflex type, autofocusing (AF) that uses the phase difference detection method has been utilized in a many models.

In the AF system using the phase difference detection method the outputs from an AF sensor and hence the distance between two images are different according to a status of proper focus, a status of forward-offset focus, and a status of backward-offset focus. Therefore, the lens is driven to obtain proper focus in such a way that the distance between the images becomes equal to a distance at the proper focus. Amount of movement of the lens, namely an amount of movement of the image surface is then calculated from the distance between the two images.

When the brightness of the object has low contrast then in this phase difference detection method light is flashed from an electronic flash device built into the camera. Phase different with respect to the object is detected based on the light reflected from the object. While detecting the phase difference, proper focus can be obtained with only one output from the sensor, and flash can be used only once under the conditions of the low brightness and low contrast of the object.

On the contrary, digital still cameras or digital video cameras use a system which is called an exploratory AF system. In this system, the lens position at which a high-frequency component of a brightness signal obtained by an image pickup device such as a CCD becomes maximum is determined as a focus position.

For example, an autofocus apparatus that uses the exploratory AF system is disclosed in Japanese Patent Laid-Open Publication No. HEI 5-268505. The autofocus apparatus disclosed in this publication comprises a flash for flashing light onto an object, a light receiver for receiving a light reflected from the object, a flash-light quantity changing unit for varying a light quantity of the flash. Further, an AF computing unit is provided for AF computing. Further, a lens is provided for accumulating the light reflected from the object and a lens driving unit is provided for driving the lens. A control section is provided for controlling each of the above-mentioned components. The control section controls in such a way that the AF computing unit does not get saturated.

The conventional technology described above gives good results in a case where AF is slow in a direction of increasing the quantity of the light to be flashed by successively increasing a driving time of the electronic flash device so as to match the change in the distance while successively driving a focal lens to a further position. However, because an AF evaluated value is computed by using a brightness signal this value becomes larger as the brightness signal becomes larger. This fact disadvantageously causes a focus position of the focal lens not to be a peak of a sampled AF evaluated value.

SUMMARY OF THE INVENTION

In light of the problems described above, it is an object of the present invention to provide an autofocus apparatus enabling a high-speed and high-precision focusing operation even when an object has a low brightness, low reflection factor, and low contrast.

In an autofocus apparatus according to this invention, a flash is performed in synchronism with a sampling timing of an AY evaluated value. Therefore, high-speed and high-precision focusing can be performed even when the object has low brightness, low reflection factor, and low contrast.

Other objects and features of this invention will become apparent from the following description with reference to the accompanying drawings.

BRIEF DESCRIPTION OF THE DRAWINGS

FIG. 4 is a flow chart for explaining an autofocus operation according to the preferred embodiment of the invention;

FIG. 7 is a view showing a ZF table used when a focus position with respect to a zoom position is adjusted in the preferred embodiment of the invention;

FIG. 10 is a view showing a truth table of the pulse motor driving IC in the driver shown in FIG. 8;

FIGS. 11A to 11D are timing charts for explaining an operation example 1;

FIG. 12 is a timing chart for explaining an operation example 3; and

DESCRIPTION OF THE PREFERRED EMBODIMENTS

Detailed description is made hereinafter for the preferred embodiments of an autofocus apparatus according to the present invention with reference to the attached drawings.

Figure 1:
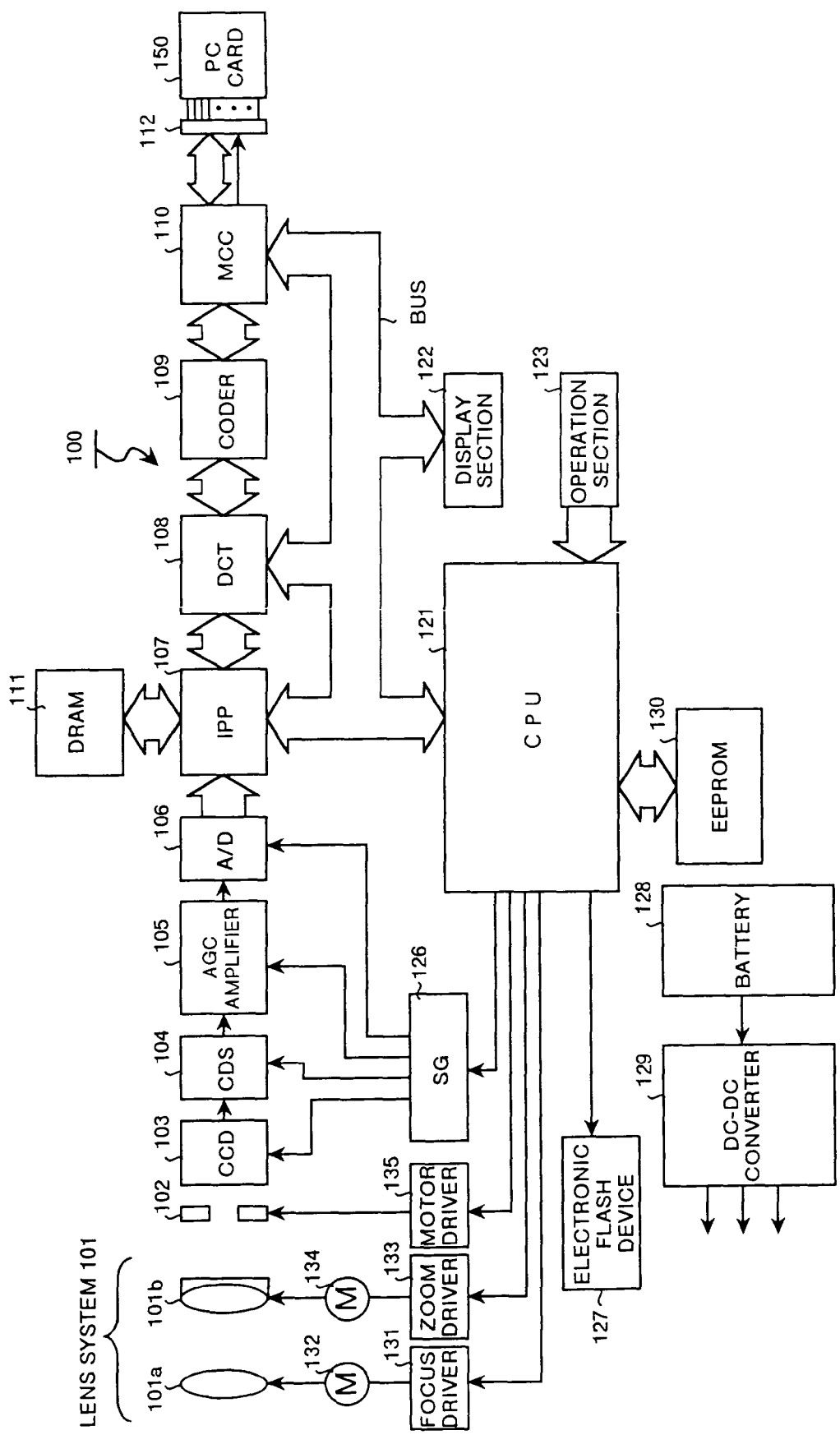
FIG. 1 is a block diagram showing a digital camera according to the invention.

FIG. 1 is a block diagram showing a digital camera with an autofocus apparatus according to a preferred embodiment of the invention applied therein. In this figure, the reference numeral 100 indicates a digital camera. This digital camera 100 comprises a lens system 101, a mechanical system 102 including a diaphragm and a filter or the like, a CCD (Charge-Coupled Device) 103, a CDS (Correlation Dual Sampling) circuit 104, an automatic gain control amplifier (AGC amplifier) 105, an A/D converter 106, an IPP (Image Pre-Processor) 107, a DCT (Discrete Cosine Transform) 108, a coder 109, an MCC (Memory Card Controller) 110, a DRAM 111, a PC card interface 112, a CPU 121, a display section 122, an operating section 123, an SG (control signal generating) section 126, an electronic flash device 127 for flashing a light under the control of the CPU 121, a buttery 128, a DC-DC converter 129, an EEPROM 130, a focus driver 131, a pulse motor 132, a zoom driver 133, a pulse motor 134, and a motor driver 135. In addition, a detachable PC card 150 is connected to the digital camera 100 via the PC card interface 112.

A lens unit comprises the lens system 101 and the mechanical system 102 including a diaphragm and a filter or the like, and a mechanical shutter of the mechanical system 102 performs concurrent exposure in two fields. The lens system 101 is formed with, for example, a vari-focal lens, and comprises a focus lens system 101a and a zoom lens system 101b.

The focus driver 131 drives the focus pulse motor 132 according to a control signal supplied from the CPU 121 to move the focus lens system 101a in the direction of the optical axis thereof. The zoom driver 133 drives the zoom pulse motor 134 according to a control signal supplied from the CPU 121 so as to move the zoom lens system 101b in the direction of the optical axis thereof. The motor driver 135 drives the mechanical system 102 according to a control signal supplied from the CPU 121, to set, for example, an f-stop value of the aperture.

The CCD 103 converts a picture which is inputted via the lens unit to an electric signal (analog image data). The CDS circuit 104 is a circuit which reduces noise of the CCD-type image pickup device.

The AGC amplifier 105 corrects a level of a signal which is subjected to correlation dual sampling in the CDS circuit 104. A gain of the AGC amplifier 105 is set by the setting-data (control voltage) in the AGC amplifier 105 by the CPU 121 via the D/A converter incorporated in the CPU 121. Furthermore, the A/D converter 106 converts analog image data from the CCD 103 which is inputted via the AGC amplifier 105 to digital image data. That is, an output signal from the CCD 103 is converted to a digital signal at an optimal sampling frequency (e.g., an integral multiple of a sampling frequency of an NTSC signal) via the CDS circuit 104 and the AGC amplifier 105 and by the A/D converter 106.

The IPP 107, the DCT 108, and the coder (Huffman Encoder/Decoder) 109 comprise a digital signal processing section. This digital signal processing section divides the digital image data which is inputted from the A/D converter 106 into color difference (Cb, Cr) and brightness (Y) and does data processing for various purposes, correction or image compression/decompression with respect to this divided data.

Furthermore, the MCC 110 stores a compressed image therein once and records the data to the PC card 150 via the PC card interface 112 or reads data from the PC card 150.

The CPU 121 uses the RAM as a work area according to a program stored in the ROM and also controls the entire operations of the digital camera according to an instruction from the operating section 123 or according to an instruction through an operation by an external device such as a remote controller not shown herein. Concretely, the CPU 121 controls operations such as an image pickup operation, an autoexposure (AE) operation, an automatic white balance (AWB) adjustment operation, and an AF operation.

Power is inputted to a DC-DC converter 129 from the buttery 128 such as a NiCd battery, a nickel-metal hydride battery, or a lithium battery, and then the power is supplied to all the sections the digital camera 100.

The display section 122 is realized by an LCD, an LED, or an EL. The display section 122 displays picked-up digital image data or recorded image data which has been compressed or decompressed. The operating section 123 has buttons for performing operations of function selection, instruction for photographing, and other various settings from the outside. Adjustment data or the like which is used when the CPU 121 controls operations of a digital camera is written in the EEPROM 130.

The above mentioned digital camera 100 (to be precise the CPU 121) has Recording mode for recording image data which is obtained by photographing the object to the PC card 150, Displaying mode for displaying the image data which is recorded on the PC card 150, and Monitoring mode for directly displaying the picked-up image data on the display section 122.

Figure 2:
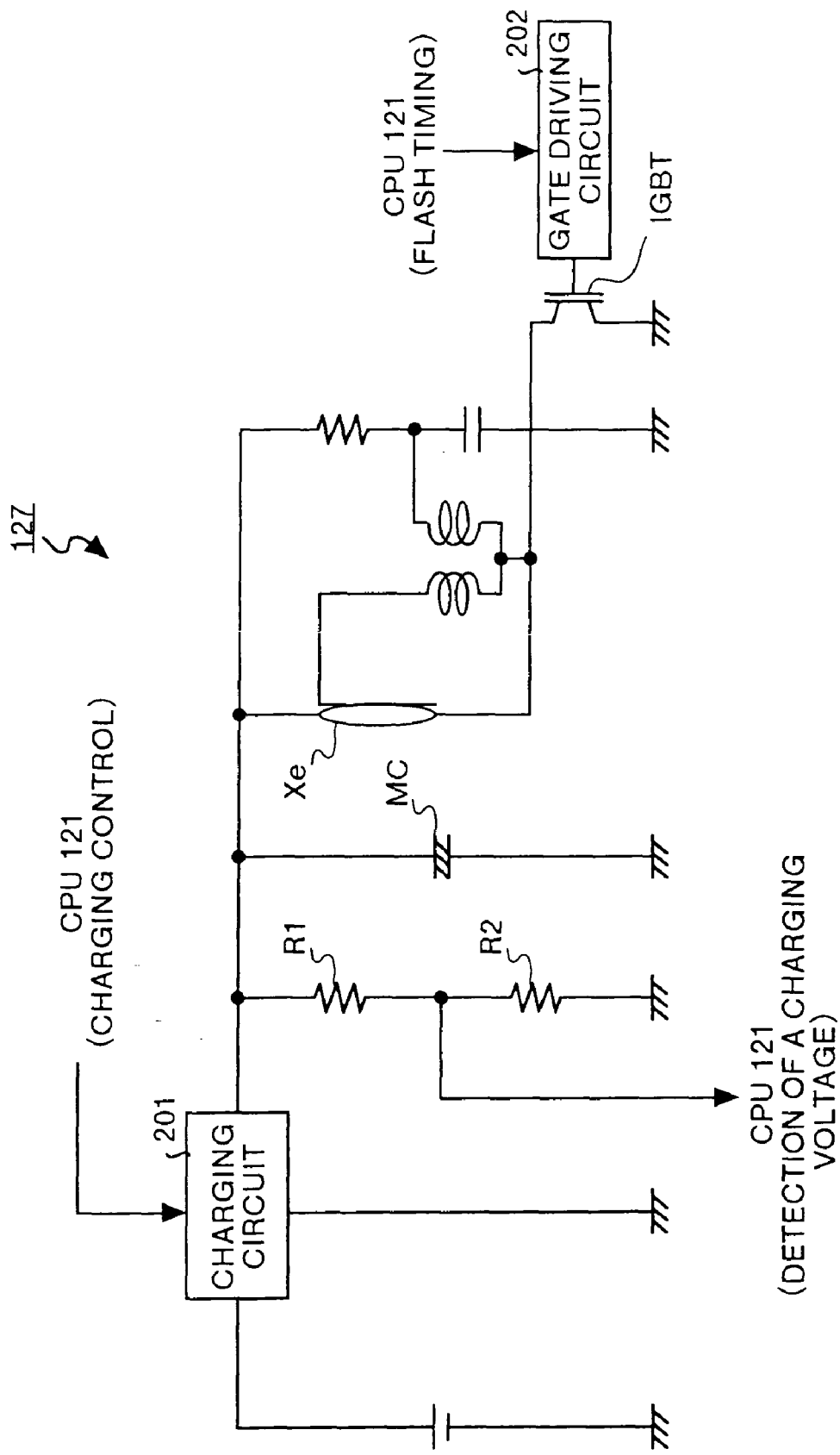
FIG. 2 is a view showing an example of configuration of the electronic flash device in FIG. 1.

FIG. 2 is a view showing an example of configuration of the electronic flash device 127. The electronic flash device 127 comprises, as shown in this figure, a charging circuit 201 for charging a main capacitor MC according to a charging signal from the CPU 121, the main capacitor MC to be charged by a voltage outputted from the charging circuit 201, partial pressure resistors R1 and R2 each for detecting a charging voltage to be charged to the main capacitor MC by the CPU 121, a flash tube Xe switched by an IGBT according to the charged voltage in the main capacitor MC to perform a flash, the IGBT being ON/OFF by a gate driving circuit 202 to switch the flash tube Xe, and a gate driving circuit 202 for turning ON/OFF the IGBT according to a flash timing signal from the CPU 121.

When a flash is to be performed, the CPU 121 sends a charge signal to the charging circuit 201 so as to charge the main capacitor MC. The charged voltage in the main capacitor MC is detected in the CPU 121 via the partial pressure resistors R1 and R2. The CPU 121 ends charging of the main capacitor MC when the charge reaches a specified voltage. The CPU 121 then sends a flash timing signal to the gate driving circuit 202. The gate driving circuit 202 makes the flash tube Xe flash via the IGBT in response to reception of the flash timing signal. With this operation, a light is flashed onto the object. That is, the flash tube Xe flashes light according to a flash timing signal from the CPU 121.

Figure 3:
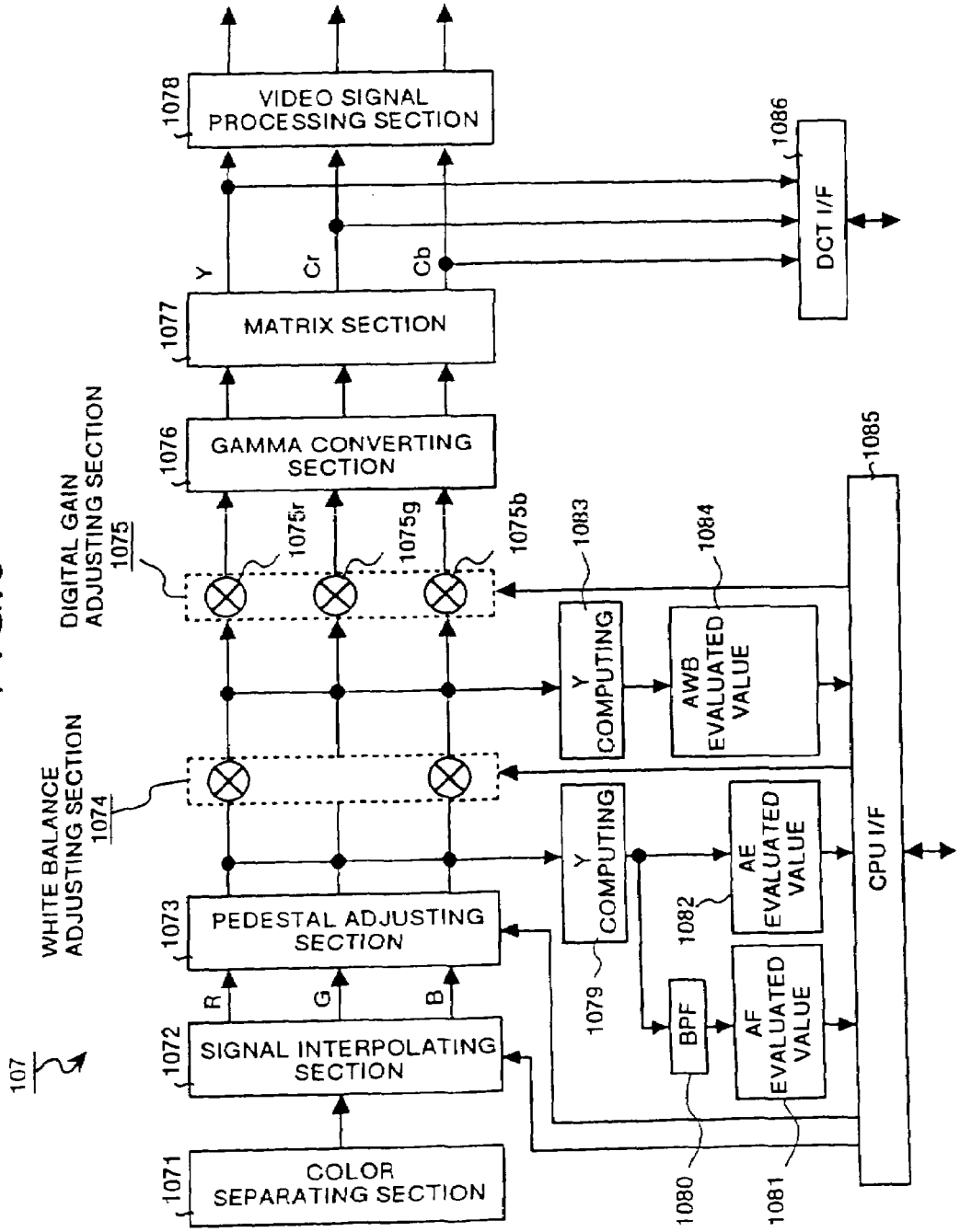
FIG. 3 is a view showing an example of concrete configuration of IPP in FIG. 1.

FIG. 3 is a view showing an example of concrete configuration of the IPP 107. The IPP 107 comprises, as shown in FIG. 3, a color separating section 1071 for separating digital image data inputted from the A/D converter 106 to each color component of R•G•B, a signal interpolating section 1072 for interpolating between the separated image data of R•G•B, a pedestal adjusting section 1073 for adjusting a black level of each image data of R•G•B, a white balance adjusting section 1074 for adjusting a white level of each image data of R and B, a digital gain adjusting section 1075 for correcting each image data of R•G•B with the gain set by the CPU 121, a gamma converting section 1076 for γ-converting each image data of R•G•B, a matrix section 1077 for separating image data of R•G•B to a color difference signal (Cb, Cr) and a brightness signal (Y), and a video signal processing section 1078 for preparing a video signal according to the color difference signal (Cb, Cr) and brightness signal (Y) to output the signal to the display section 122.

The IPP 107 also comprises a Y-computing section 1079 for detecting brightness data (Y) of image data after being subjected to pedestal adjustment by the pedestal adjusting section 1073, a BPF 1080 for passing therethrough only a specified frequency component of the brightness data (Y) which is detected in the Y-computing section 1079, an AF evaluated value circuit 1081 for outputting an integrated value of the brightness data (Y) which is passed through the BPF 1080 to the CPU 121 as an AF evaluated value, an AE evaluated value circuit 1082 for outputting a digital count value corresponding to the brightness data (Y) detected in the Y-computing section 1079 to the CPU 121 as an AE evaluated value. Further, the IPP 107 comprises a Y-computing section 1083 for detecting brightness data (Y) of each image data of R•G•B after being subjected to white balance adjustment in the white balance adjusting section 1074, an AWB evaluated value circuit 1084 for counting brightness data (Y) for each color which is detected in the Y-computing section 1083 and outputting the data to the CPU 121 as an AWB evaluated value for each color, a CPU I/F 1085 as an interface with the CPU 121, and a DCT I/F 1086 as an interface with the DCT 108.

The AF control is described bellow. In the AF control, after a shutter speed and a gain are set, a focus pulse motor 132 is driven according to specified pulses during a 1Vd period. While the focus pulse motor 132 is driving for specified pulses, a digital video signal obtained in the IPP 107 is processed to obtain a brightness signal. High-frequency components of this brightness signal are integrated to obtain an AF evaluated value, and the peak of this AF evaluated value is decided as a focus position.

In zoom control, the present position (distance) of the focus between the set value "fp far calc" (Infinity) described later and the set value "fp near calc" (Close proximity; about 0.2 m) can be obtained from a ratio. The focus position is driven, in association with zoom driving, to the position that becomes the same ratio with the above ratio from "fp far def" and "fp near def" at the zoom point so that an out-of-focus caused by zooming of a vari-focal lens can be corrected.

The set values which are also the adjustment values for AF operations are described bellow. FIG. 4 is a view for explaining the set values. It is assumed that autofocusing is performed, as shown in FIG. 4, by using a vari-focal lens with nine zoom steps (positions) from 00 to 08. The range of photography is from Infinity to around 0.2 m, and is to around 0.01 m only for a wide-angle shot.

In a table shown in FIG. 4, each of the zoom steps has six types of set value of "ccdaf drv data", "fp far def", "fp near def", "fp far calc", "fp near calc", and "nml smp" correlated thereto respectively. Each of the set values in FIG. 4 is represented in hexadecimal notion.

Herein, the "ccdaf drv data" represents a driving rate (the number of pulses) of a focus lens system for each sampling when an AF evaluated value is sampled. The "fp far def" represents a starting position for sampling an AF evaluated value in each zoom step and a difference from a position of the number of pulses "fp inf def" generated for focusing as a reference has been inputted thereto as data.

The "fp near def" represents a sampling end position for an AF evaluated value in each of the zoom steps and a difference from the position of the number of pulses "fp inf def" generated for focusing as a reference has been inputted thereto as data. The "fp far calc" represents an infinity position in each of the zoom steps and a difference from the position of the number of pulses "fp inf def" generated for focusing, as a reference has been inputted thereto as data.

The "fp near calc" represents a position of 0.2 m in each of the zoom steps and a difference from the position of the number of pulses "fp inf def" generated for focusing as a reference has been inputted thereto as data. The "nml smp" represents the number of samplings for driving the focus lens system to sample along the entire area where sampling of AF evaluated values is inevitably executed regardless of a sampling result of AF evaluated values.

The "fp inf def" represents the number of pulses generated for focusing from the mechanical end in the infinity side of the focus to the starting point of sampling an AF evaluated value of wide-angle.

Figure 5:
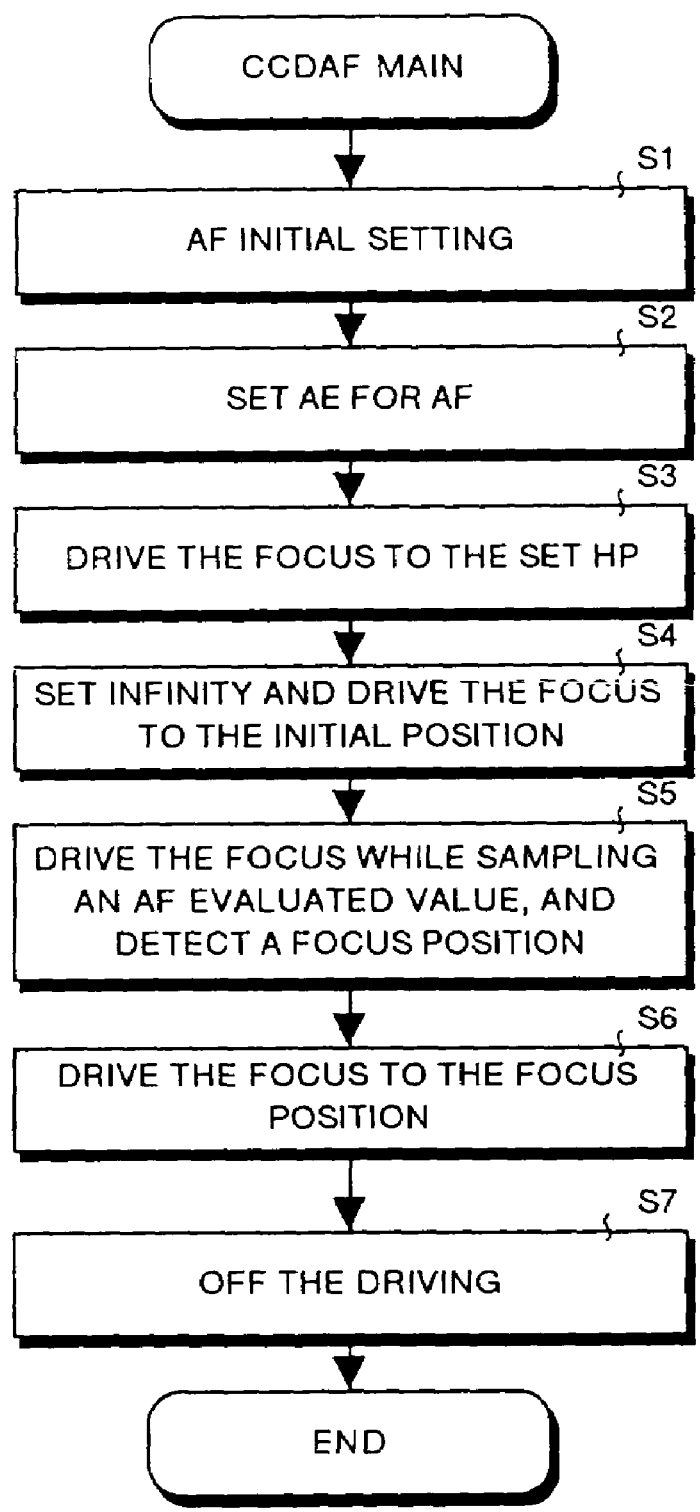
FIG. 5 is a flow chart for explaining a setting operation for performing the autofocus operation according to the preferred embodiment of the invention.
Figure 6:
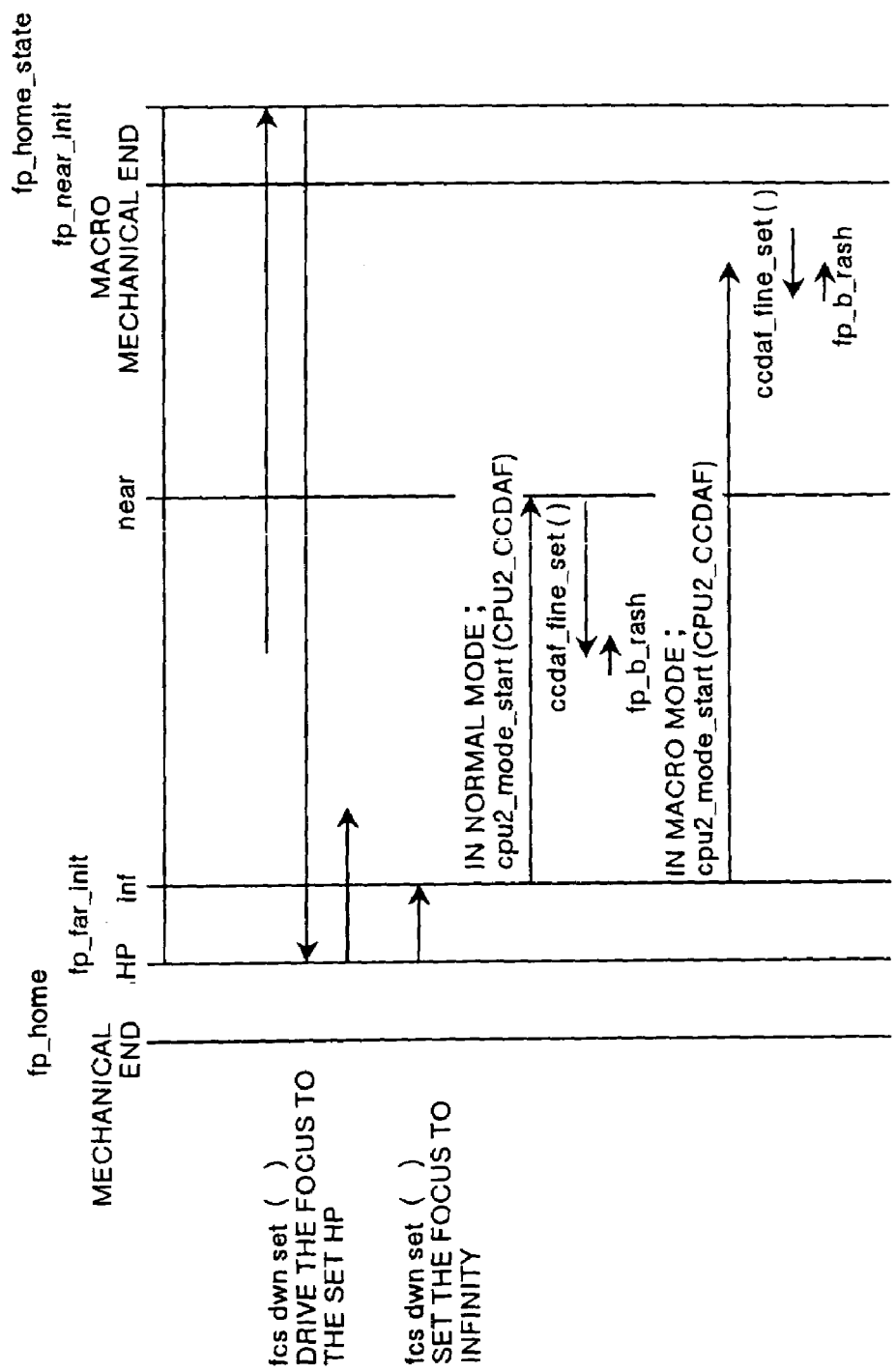
FIG. 6 is a view for explaining a set value according to the preferred embodiment of the invention.

Operation of this embodiment is explained bellow. FIG. 5 is a flow chart for explaining a setting operation for performing the autofocus operation. FIG. 6 is a flow chart for explaining the autofocus operation.

In FIG. 6, each set value is described as follows: fp far init=the number of pulses generated for focusing (fp inf def)–an AF evaluated value sampling starting position (fp far def [zoom]), fp near init=the number of pulses generated for focusing (fp inf def)+an AF evaluated value sampling end position (fp near def [zoom]), fp home=(fp far init)–(fp home def), and nml smp def=nml smp [zoom]. Herein, zoom represents a position in 9 zoom steps, and zoom=0 represents "wide" position, zoom=4 represents "mean" position, and zoom=8 represents "tele" position.

In the operation shown in FIG. 6, at first, zoom reset is executed by matching a zoom position with the number of pulses for zoom driving, and then focus reset is executed by matching a focus position with the number of pulses for focus driving. These zoom reset and focus reset are executed by driving each position to the mechanical end respectively.

A position after driving with the number of pulses more than that for driving each position to the mechanical end is decided as a position of a specified number of pulses. Herein, in a case of focusing, fp max=205 pulses is shown at the mechanical end in the "near" side. Data for a last pulse output when driving the focus to the mechanical end is set on adjustment as fp home state. Next, the focus is set at a normal focal position (around 2.5 m), and then zooming is executed.

Then, the operation shown in FIG. 5 is started. The operation mode shown in FIG. 5 is Autofocus mode. In the Autofocus mode, at first, AF initial setting (ccdaf init set) is executed (step S1), and first release is operated. In this process, a normal focal position (around 2.5 m) at the set zoom point is computed from an adjusted value, and the AF operation is performed. Then, setting of AE (ccdaf ae set) for AF is executed (step S2).

In step S3, the focus is driven to the home position HP (fp home). In step S4, the focus is driven to the initial position INIT (fp far init). As described above, by driving the focus from the home position HP to the initial position INIT, backlash (fp b lash=8 (pulses)) can be removed.

The processing is then shifted to step S5. Driving of the focus at the time of sampling an AF evaluated value is executed in synchronism with a vertical synchronizing signal Vd. In this case, the focus is driven for an amount (ccdaf drv data) of a focus lens system for each sampling. In this process, driving of the focus is continued as far as the "near" position (until an AF evaluated value by nml smp is sampled, which is up to (ccdaf drv data)*(nml smp) as a driving rate of the focus) regardless of any value (information such as a peak) of the AF evaluated values. This is within a normal range of a photographing distance (from Infinity to around 0.5 m).

Herein, a peak position and data for fluctuations in an AF evaluated value or the like are computed from the AF evaluated value sampled within the normal range of a photographing distance, and it is determined whether or not a focus position exists within the normal range of a photographing distance. Even when focusing is executed within a macro range of a photographing distance, the focus lens is driven to a focus position, after the focus is driven from the focus position to a position where backlash is removed.

The processing is then shifted to step S6. In step S6, when a focus position is within the normal range of photography then the sampling of an AF evaluated value is stopped, and after the focus is driven from the focus position to a position where backlash is removed the focus is again driven to the focus position.

Furthermore, when the focus position is not within the normal range of photography, an AF evaluated value within the macro range of a photographing distance (from around 0.5 m to around 0.2 m) is sampled (up to macro: fp near init). However, sampling of an AF evaluated value is stopped when a peak is detected within the macro range of a photographing distance.

The processing is then shifted to step S7. In step S7, the driving of the focus is turned OFF (fcsm off), and the processing ends.

Figure 8:
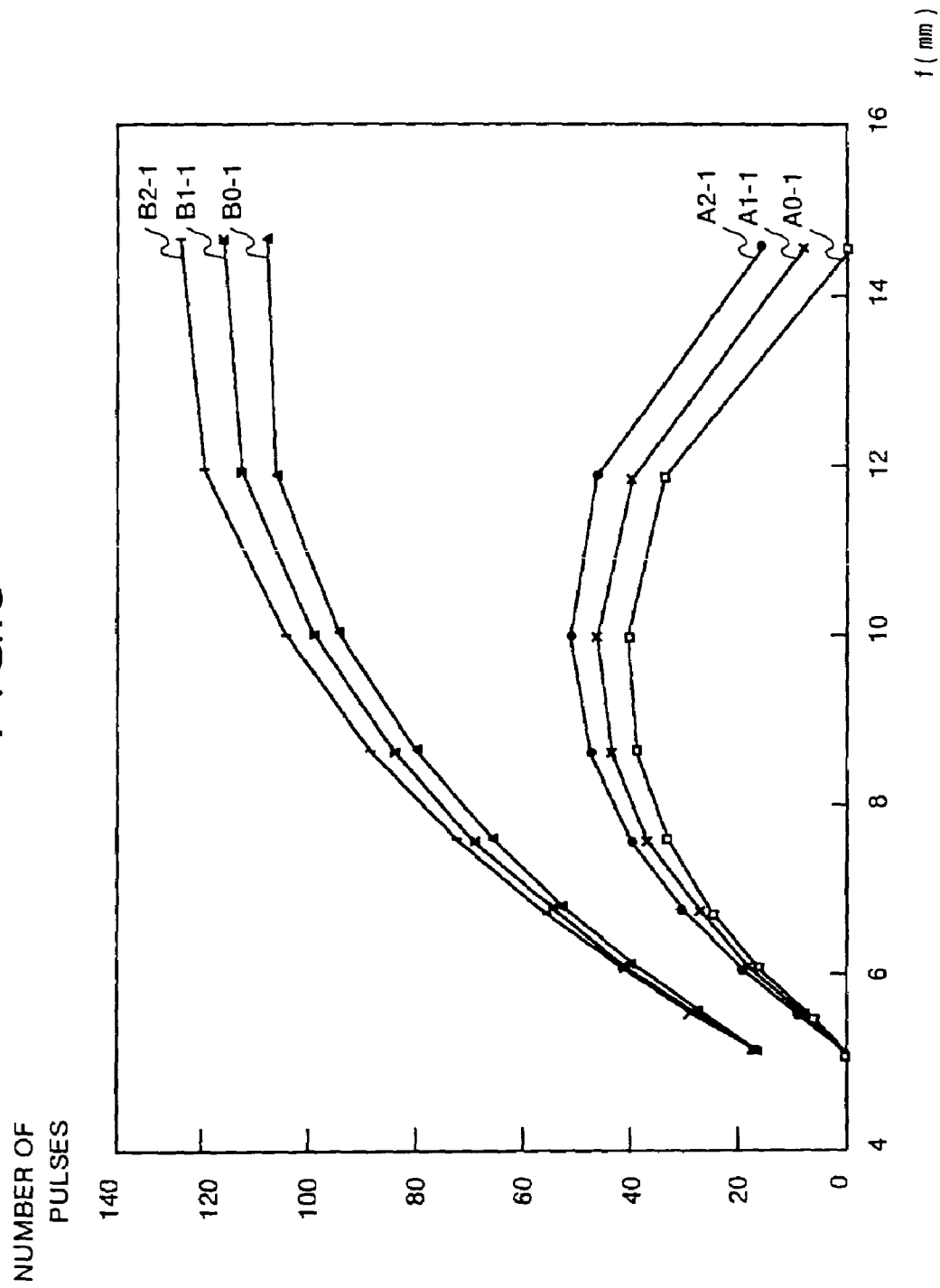
FIG. 8 is a view showing the ZF table in FIG. 7 in graphical form.

A relation between a zoom position and a focus position is explained. FIG. 7 is a view showing a ZF (zoom-focus) table used for focus position adjustment. FIG. 8 shows the ZF table in FIG. 7 in a graphical form.

The ZF table is used for adjusting a focus position to a zoom position. The ZF table shown in FIG. 7 shows three examples, No. 0, No. 1, and No. 2. In any of the examples, nine positions between a Wide (W) end . . . a Mean (M) . . . a Tele (T) end are allocated to two references of Infinity and Close proximity (e.g., 20 cm). This ZF table contains the number of pulses ZP and an adjustment value (f (mm)) corresponding to these nine positions. This ZF table is stored in a ROM or the like.

FIG. 8 shows Infinity reference A0-1 and Minimum range reference B0-1 as a graph of No. 0, Infinity reference A1-1 and Close proximity reference B1-1 as a graph of No. 1, and Infinity reference A2-1 and Close proximity reference B2-1 as a graph of No. 2. It is clear from these graphs that the number of pulses becomes smaller in the case of Close proximity reference as compared to that in the case of Infinity reference.

Figure 9:
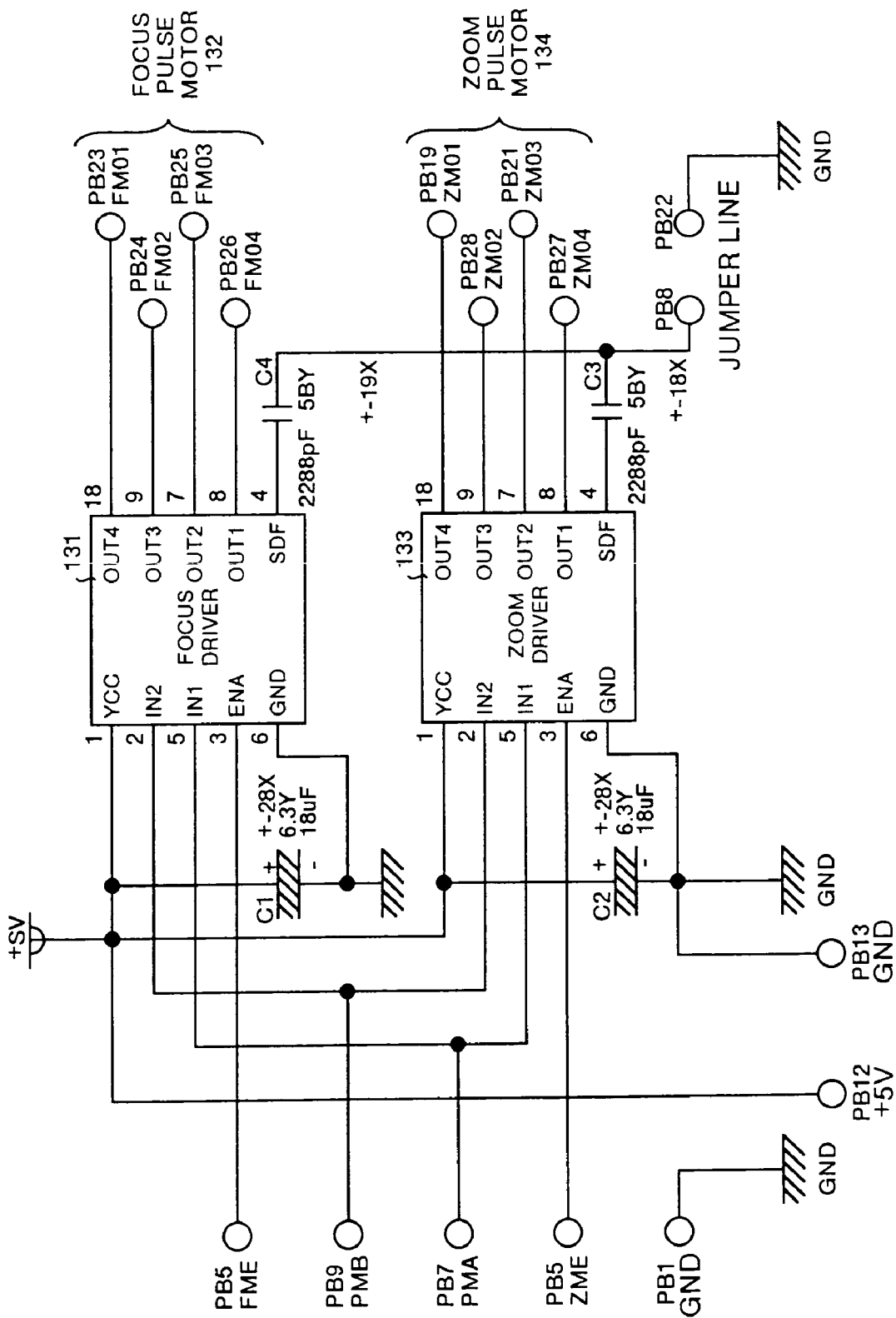
FIG. 9 is a circuit diagram showing drivers of the zoom pulse motor as well as of a focus pulse motor according to the preferred embodiment of the invention.

The drivers are described here. FIG. 9 is a circuit diagram showing the drivers of a zoom pulse motor 132 as well as of a focus pulse motor 134 (focus driver 131 and zoom driver 133), and FIG. 10 is a view showing a truth table of a pulse motor driving IC. In FIG. 9, the focus driver 131 and zoom driver 133 define a relation of input/output according to the truth table shown in FIG. 10.

According to the truth table shown in FIG. 10, when an enable signal in each of the circuits is "L" (LOW), there is no input (IN 1, 2) into the focus driver 131 and zoom driver 133 shown in FIG. 9, and they are in the standby mode with each output (OUT 1, 2, 3, and 4) is OFF. On the other hand, when the enable signal is "H" (HIGH), according to the logical relation between the inputs IN 1 and IN 2, they drive and the outputs OUT 1 to 4 becomes outputs for generating changes in two-phase excitation.

An AF operation along with a flash is explained below with reference to an operation example 1 to an operation example 6. The AF operation along with a flash is effective when the object has low brightness, low reflection factor, and low contrast.

Operation example 1 is explained here with reference to FIGS. 11A to 11D. FIGS. 11A to 11D are timing charts that explain the operation example 1. FIG. 11A shows a vertical synchronizing signal (VD). FIG. 11B shows a sampling timing of an AF evaluated value (image fetching timing). FIG. 11C shows a driving pulse (driving timing of the lens system 101) of the a pulse motor. FIG. 11D shows a timing at which the electronic flash device 127 performs a flash.

The operation example 1 shows a case where a flash is performed in synchronism with a sampling timing of an AF evaluated value and the quantity of light of each flash is maintained at a constant value as far as possible.

At first, the CPU 121 drives the pulse motors (focus pulse motor 132, zoom pulse motor 134) at a timing shown in FIG. 11C to drive the lens system 101 (focus lens system 101a, zoom lens system 101b). Further, the CPU 121 fetches an image at the timing shown in FIG. 11B while driving the lens system 101 to compute an AF evaluated value in the above mentioned method.

Then, the CPU 121 makes the flash tube Xe of the electronic flash device 127 flash in synchronism with the timing shown in FIG. 11D, namely with the sampling timing of an AF evaluated value during integration of CCD before the image is fetched. In this process, the CPU 121 controls a light quantity of the flash by the flash tube Xe according to a charged voltage in the main capacitor MC of the electronic flash device 127 (Refer to FIG. 2) as well as to an ON time of the IGBT (flashing time) as described above. Then, the CPU 121 determines a focus position according to the sampled AF evaluated value and drives the lens system 101 to the focus position.

As described above, with the operation example 1, a flash is performed in synchronism with a sampling timing of an AF evaluated value in such a way that the quantity of light of each flash is maintained constant as far as possible. Accordingly, the same quantity of reflected light from the object can be received by the CCD 103 at the time of sampling of each AF evaluated value, which allows a focus position to be identified with high precision even if the object has a low brightness, low reflection factor, and low contrast.

An operation example 2 is explained here. The operation example 2 shows a case where sampling of an AF evaluated value is performed within a where the flash reaches.

At first, the CPU 121 determines a maximum distance (e.g., 3 m) where a flash can reach. The maximum distance where the flash can reach is determined according to an F value of the lens system 101, sensitivity of the CCD 103, and a gain of the AGC amplifier 105 or the like. Further, a distance for photography (focus position) at each focal distance (zoom position) can be detected or set according to the number of pulses for driving a pulse motor.

The CPU 121 drives the lens system 101 from a minimum distance (which may be a shortest distance for photographing with a flash-light adjusted) up to the above-mentioned reachable maximum distance to sample an AF evaluated value and also makes the flash tube Xe of the electronic flash device 127 flash in synchronism with a sampling timing of an AF evaluated value. In that process, the CPU 121 controls, same as to the operation example 1, a quantity of light of the flash by the flash tube Xe according to a charged voltage in the main capacitor MC of the electronic flash device 127 (Refer to FIG. 2) as well as to an ON time of the IGBT (flashing time). Then, the CPU 121 determines a focus position according to the sampled AF evaluated value and drives the lens system 101 to the focus position.

Furthermore, in the operation example 2, sampling of an AF evaluated value and a flash are executed within a range where a flash can reach (within a photographable range), so that the areas where the AF evaluated values are sampled and the number of flashes can be reduced. This allows a time for executing an AF operation to be reduced as well as power consumption to be decreased. Further, this operation allows the light quantity per sampling of an AF evaluated value to be larger, so that proper focus can be obtained even if the object has a low reflection factor.

Operation example 3 is described here with reference to FIG. 12. FIG. 12 is a timing chart for explaining the operation example 3, which shows a flashing timing. The operation example 3 shows a case where a flash is performed for both the purposes of acquiring an AF evaluated value and the purpose of reducing red-eye.

At first, the CPU 121 performs sampling of an AF evaluated value while driving the lens system 101, and makes the flash tube Xe of the electronic flash device 127 flash in synchronism with the sampling timing of an AF evaluated value during integration of the CCD before an image is fetched (1/60Hz). In that process, the CPU 121 controls the quantity of light of the flash from the flash tube Xe according to a charged voltage in the main capacitor MC of the electronic flash device 127 (Refer to FIG. 2) as well as to an ON time of the IGBT (flashing time).

Then, even flash is performed in synchronism with the sampling timing of an AF evaluated value, when the flash does not reach a total strobe-light quantity as well as the number of flashing which have the effect of reducing the red-eye effect, only flash is continuously performed until the effect of reducing red-eye is attained.

Then, the CPU 121 computes a peak (focus position) according to the sampled AF evaluated value to drive the lens system 101 to the focus position. After the step, if a charged voltage in the electronic flash device 127 (a charged voltage in the main capacitor MC) decreases, the CPU 121 charges the electronic flash device during the period until the next flashing after the lens system 101 is driven to the focus position.

The CPU 121 performs a flash about 1 second after the flash which is in synchronism with initial sampling of an AF evaluated value and record an image. In a focus-lockable digital camera, when recording is operated after the time passes after locking of the focus, recording may be operated after flashing for reduction of red-eye is performed as usual.

As described above, in the operation example 3, a flash is shared for both the purposes of acquiring an AF evaluated value and the purpose of reducing red-eye. Therefore, the time for executing an AF operation and power consumption can be reduced. Further, an uneasiness caused due to a plurality flashes is also eliminated.

Figure 13:
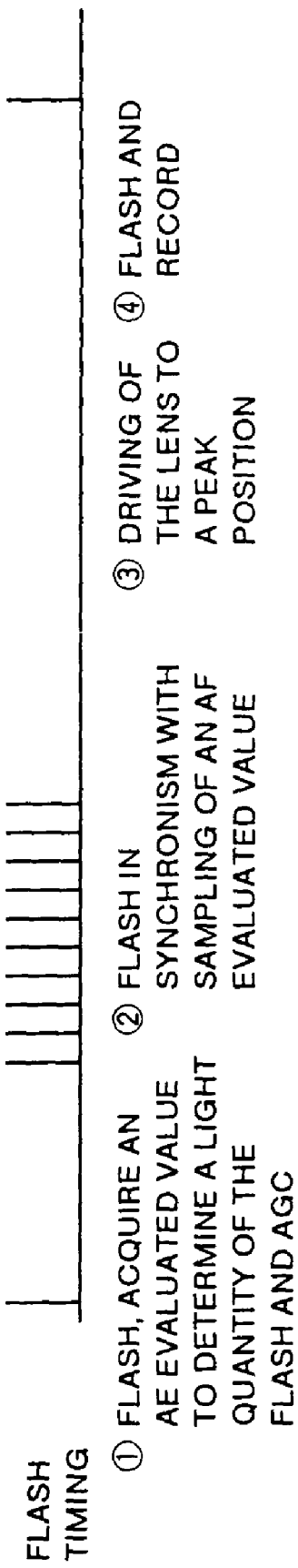
FIG. 13 is a timing chart for explaining an operation example 4.

Operation example 4 is explained here with reference to FIG. 13. FIG. 13 is a timing chart for explaining the operation example 4, which shows a flashing timing. The operation example 4 shows a case where there are steps of acquiring an AE evaluated value by pre-flashing, calculating a light quantity of a flash and a gain set value of the AGC amplifier 105 according to the AE evaluated value, setting the calculated light quantity and gain set value of the AGC amplifier 105, and performing a flash in synchronism with the sampling timing of an AF evaluated value.

At first, the CPU 121 performs pre-flashing from the electronic flash device 127 to acquire an AE evaluated value in order to compute a strobe-light quantity (exposure time) at the time of sampling an AF evaluated value as well as a gain value of the AGC amplifier 105. The area where AE evaluated values are acquired is the substantially same as the area where AF evaluated value are sampled.

Then, the CPU 121 calculates a strobe-light quantity at the time of sampling an AF evaluated value as well as a gain value of the AGC amplifier 105 according to the acquired AE evaluated value, and sets the gain value of the AGC amplifier 105.

Then, the CPU 121 performs sampling of an AF evaluated value while driving the lens system 101, and makes the flash tube Xe of the electronic flash device 127 flash in synchronism with the sampling timing of an AF evaluated value during integration of the CCD before an image is fetched (1/60Hz). Then, the CPU 121 computes a peak (focus position) according to the sampled AF evaluated value to drive the lens system 101 up to the focus position.

The CPU 121 sets a gain value of the AGC amplifier 105 for flashing when an image is recorded, and a flash is performed after about 1 second from the flash which is in synchronism with initial sampling of an AF evaluated value, and records an image.

As described above, with the operation example 4, there are steps of acquiring an AE evaluated value by pre-flashing, calculating a strobe-light quantity and a gain set value of the AGC amplifier 105 according to the AE evaluated value, setting the calculated strobe-light quantity and gain set value of the AGC amplifier 105, and flashing in synchronism with the sampling timing of an AF evaluated value. Therefore, a probability of saturation of AF evaluated values which is due to a position of the lens system 101 can be reduced.

Explanation of an operation example 5 will be described bellow. By the way, there is sometimes a case where flashing can not continuously be made by the number of samplings of an AF evaluated value when the object is in a distance or the object has low reflection factor. In the operation example 5, then, a necessary number of samplings of an AF evaluated value and a strobe-light quantity that can be flashed at the time of said sampling are computed, or a necessary strobe-light quantity for sampling an AF evaluated value is calculated according to an AE evaluated value acquired by pre-flashing, and a strobe-light quantity or the like is determined by comparing both results of calculation.

At first, the CPU 121 determines a range where the lens system 101 (e.g., 0.5 to 3 m) can be driven concurrently with flashing according to an F value or the like in a set focal distance. Then, the CPU 121 determines the number of samplings of an AF evaluated value for detecting a peak (focus position) within the above mentioned range. The CPU 121 computes a strobe-light quantity which can be flashed at one sampling of an AF evaluated value according to a charged voltage in the electronic flash device and the number of samplings of AF evaluated value. Then, the CPU 121 acquires an AE evaluated value by pre-flashing to determine a strobe-light quantity for sampling an AF evaluated value. The CPU 121 calculates a strobe-light quantity according to the acquired AE evaluated value.

After the steps, the CPU 121 compares the strobe-light quantity calculated according to a charged voltage in the electronic flash device as well as to the number of samplings of an AF evaluated value to the strobe-light quantity calculated according to the AE evaluated value acquired by pre-flashing. When the strobe-light quantity calculated according to the AE evaluated value acquired by pre-flashing is larger than the strobe-light quantity calculated according to the charged voltage in the electronic flash device as well as to the number of samplings of the AF evaluated value as a result of the comparison, the CPU 121 flashes a strobe light in synchronism with the sampling timing of an AF evaluated value in the strobe-light quantity calculated according to the charged voltage in the electronic flash device as well as to the number of samplings of the AF evaluated value. In that process, it may be programmed to increase a gain of the AGC amplifier 105.

When the strobe-light quantity calculated according to the AE evaluated value by pre-flashing is larger than the strobe-light quantity calculated according to the charged voltage in the electronic flash device as well as to the number of samplings of the AF evaluated value, the number of sampling of an AF evaluated value may be reduced and a strobe light may be flashed in the strobe-light quantity calculated according to the AE evaluated value acquired by pre-flashing in place of flashing a strobe light in the strobe-light quantity calculated according to the charged voltage in the electronic flash device as well as to the number of samplings of the AF evaluated value.

As described above, with the operation example 5, there are steps of comparing a strobe-light quantity computed according to a charged voltage in the electronic flash device as well as to the number of samplings of an AF evaluated value to a strobe-light quantity calculated according to the AE evaluated value acquired by pre-flashing; flashing a strobe light which is in synchronism with the sampling timing of an AF evaluated value, when a strobe-light quantity calculated computed according to the AE evaluated value acquired by pre-flashing is larger than a strobe-light quantity calculated according to a charged voltage in the electronic flash device as well as to the number of samplings of an AF evaluated value, in the strobe-light quantity calculated according to the charged voltage in the electronic flash device as well as to the number of samplings of the AF evaluated value; or reducing the number of samplings of an AF evaluated value, and flashing a strobe light in a strobe-light quantity calculated according to the AE evaluated value acquired by pre-flashing. That is, a strobe-light quantity or the number of samplings of an AF evaluated value are reduced as required, which allows a strobe light for each sampling of an AF evaluated value to be maintained constant. Also, this operation enhances a possibility of obtaining proper focus even with an electronic flash device having a limited function.

Explanation of an operation example 6 will be described bellow. The operation example 6 shows a case where sampling of an AF evaluated value with flashing is not executed, when an AE evaluated value is not improved even flashing.

At first, the CPU 121 acquires an AE evaluated value when pre-flashing is made to determine a strobe-light quantity for flashing in synchronism with a sampling timing of an AF evaluated value. Then, the CPU 121 acquires an AE evaluated value when flashing is not made. Then, the CPU 121 compares an AE evaluated values which are with or without flashing. And it does not execute sampling of an AF evaluated value when the evaluated values are not different to each other. That is, when an AE evaluated value is found not to increase by flashing because a strobe light does not reach to the object which is located far from the electronic flash device or the object has a low reflection factor.

As described above, with the operation example 6, when an AE evaluated value is not improved even by flashing, it is considerable that a strobe light does not reach the object located far from the electronic flash device or the object has a low reflection factor, and because of that, it is difficult to detect a peak of an AF evaluated value even by sampling of the AF evaluated value with flashing. Therefore it is possible to prevent a waste of power consumption as well as of time for execution, by selecting not to sample an AF evaluated value with flashing.

Although a strobe light is used as an auxiliary light in the above mentioned embodiment, the present invention is not limited to the light described above, and it may use any auxiliary light such as a lamp and a high-brightness LED.

The present invention is not to be thus limited but are to be construed as embodying all modifications and alternative constructions that may occur to one skilled in the art which fairly fall within the basic teaching herein set forth.

With the present invention, in an apparatus for determining a focus position by a result of sampling an AF evaluated value and driving a focus lens system to the focus position, a strobe light is flashed in synchronism with a sampling timing of an AF evaluated value, and a quantity of the light of each flash is maintained constant. Therefore a high-speed and high-precision focusing operation becomes possible even when the object has low brightness, low reflection factor, and low contrast.

With the present invention, in the apparatus described above, a range where an AF evaluated value is sampled is set to a range where a strobe light can reach. Therefore, it is possible to reduce time for executing an AF operation as well as power consumption.

With the present invention, in the apparatus described above, a flash is used to obtain an AF evaluated value as well as for reducing the red-eye effect. Therefore, it is possible to reduce time for executing an AF operation as well as power consumption, and also to eliminate the uneasiness which is due to multi-flashing.

With the present invention, in the apparatus described above, a light quantity of a flash is determined in synchronism with a sampling timing of an AF evaluated value according to an AE evaluated value acquired at the time of flashing the strobe light. Therefore, the probability of saturation of AF evaluated values which is due to the position of the lens system 101 can be reduced.

With the present invention, in the apparatus described above, it is determined whether flashing is possible in the light quantity to be flashed required for the number of sampling times of an AF evaluated value or not, and when it is determined that the flashing is not possible, a strobe-light quantity to be flashed is reduced or the number of sampling times of an AF evaluated value is reduced. Therefore, it can enhance the possibility of obtaining proper focus can be enhanced even with an electronic flash device having a limited function.

With the present invention, in the apparatus described above, an AE evaluated value acquired when a strobe light is flashed is compared to an AE evaluated value acquired without flashing a strobe light, and when it is found that both of the values are not different, flashing is not made for sampling an AF evaluated value. Therefore, it can prevent a waste of power consumption as well as of time for execution. Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An autofocus apparatus comprising:
  an image pickup means for converting light of an object received through a focus lens system to electric signals and outputting the signals as image data;
  an A/D converting means for A/D-converting the image data to obtain digital image data;

an AF evaluating means for outputting an AF evaluated value obtained by integrating high-frequency components of brightness data in the digital image data;

a sampling means for sampling the AF evaluated value obtained by said AF evaluating means while moving a position of said focus lens system;

a flash means for illuminating light; and a focus driving means for determining a focus according to a result of the sampling of the AF evaluated value by said sampling means and driving said focus lens system to the focus position, wherein the illuminating light is flashed in synchronism with a sampling timing of the AF evaluated value.

2. The autofocus apparatus according to claim 1, wherein the range where the AF evaluated value is sampled is set to a range where the light of the flash can reach.

3. The autofocus apparatus according to claim 1, wherein the light of the flash is used to obtain the AF evaluated value as well as for reducing red-eye effect.

4. The autofocus apparatus according to claim 1, further comprising:

an AE evaluating means for calculating an AE evaluated value corresponding to the brightness data in the digital image data, wherein a quantity of the light of flash is determined in synchronism with the sampling timing of the AF evaluated value according to the AE evaluated value acquired at the time of the flash.

5. The autofocus apparatus according to claim 1, wherein it is determined whether or not a flash having a required light quantity can be performed for a number of sampling times of the AF evaluated value, and when it is determined that the flash can not be performed then the light quantity of the flash is reduced or the number of sampling times of the AF evaluated value is reduced.

6. The auto focus apparatus according to claim 1, further comprising:

an AE evaluating means for calculating an AE evaluated value corresponding to the brightness data for the digital image data, wherein the AE evaluated value acquired when the flash is performed is compared to the AE evaluated value acquired without the flash, and when both of the values are not different, the flash is not performed when sampling the AF evaluated value.

7. An autofocus apparatus, comprising:

an image pickup device which converts light of an object received through a focus lens system to electric signals and outputting the signals as image data;

an A/D converter which A/D-converts the image data to obtain digital image data;

an AF evaluating unit which outputs an AF evaluated value obtained by integrating high-frequency components of brightness data in the digital image data;

a sampling unit which samples the AF evaluated value obtained by said AF evaluating unit while moving a position of said focus lens system;

a flash which illuminates light; and a focus driver which determines a focus according to a result of the sampling of the AF evaluated value by said sampling unit and driving said focus lens system to the focus position, wherein the illuminating light is flashed in synchronism with a sampling timing of the AF evaluated value.

8. The autofocus apparatus according to claim 7, wherein a range where the AF evaluated value is sampled is set to a range where the light of the flash can reach.

9. The autofocus apparatus according to claim 7, wherein the light of the flash is used to obtain the AF evaluated value as well as for reducing red-eye effect.

10. The autofocus apparatus according to claim 7, further comprising:

an AE evaluating unit which calculates an AE evaluated value corresponding to the brightness data in the digital image data, wherein a quantity of the light of flash is determined in synchronism with the sampling timing of the AF evaluated value according to the AE evaluated value acquired at the time of the flash.

11. The autofocus apparatus according to claim 7, wherein it is determined whether or not a flash having a required light quantity can be performed for a number of sampling times of the AF evaluated value, and when it is determined that the flash can not be performed then the light quantity of the flash is reduced or the number of sampling times of the AF evaluated value is reduced.

12. The autofocus apparatus according to claim 7, further comprising:

an AE evaluating unit which calculates an AE evaluated value corresponding to the brightness data for the digital image data, wherein the AE evaluated value acquired when the flash is performed is compared to the AE evaluated value acquired without the flash, and when both of the values are not different, the flash is not performed when sampling the AF evaluated value.

* * * * *